Patented Dec. 25, 1934

1,985,747

UNITED STATES PATENT OFFICE 1,985,747

ETHER - LIKE CONSTITUTED COMPOUND HAVING WETTING, DISPERSING, EMULSIFYING, AND WASHING PROPERTIES

Adolf Steindorff, Karl Daimler, and Karl Platz, Frankfort-on-the-Main-Hochst, Germany, assignors to General Aniline Works, Inc., New York, N. Y., a corporation of Delaware No Drawing. Application April 9, 1931, Serial No. 528,974. In Germany April 17, 1930

5 Claims. (Cl. 260—151)

The present invention relates to ether-like constituted compounds having wetting, dispersing, emulsifying and washing properties.

We have found that an aliphatic sulfonic acid containing hydroxyl or halogen or a derivative thereof having the general formula:

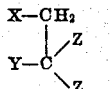

wherein X may stand for $SO_3H$, Y may stand for a substituent of the group consisting of OH, O—$SO_3H$, halogen, X and Y together may stand for the group

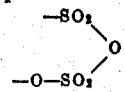

and Z may stand for H or alkyl may react with an aliphatic body containing hydroxyl and having the general formula:

wherein R stands for a hydrocarbon radicle, the molecule of which contains more than 3 carbon atoms, with formation of an ether-like body which, due to its external sulfo-groups readily dissolves in acids and shows remarkable properties when being used in the textile industry. The products obtained having the following formula:

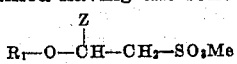

wherein $R_1$ stands for a hydrocarbon radical, the molecule of which contains more than 3 carbon atoms and Z, stands for H or alkyl, and Me stands for hydrogen, an alkali metal or ammonium, possess a particularly strong foaming power and an excellent soap-like action and at the same time a high resistance to lime and they are excellent wetting agents, dispersing agents, emulsifying agents and washing agents.

The process may, for instance, be conducted by combining the hydroxy-ethane-sulfonic acid or the homologue thereof with an aliphatic alcohol of high molecular weight, for instance with the aid of gaseous hydrochloric acid water being split off. It may likewise be advantageous to use carbyl sulfate or ethionic acid instead of hydroxy-ethane-sulfonic acid or a salt thereof, the reaction occurring much more quickly owing to the sulfuric acid which is liberated during the reaction. Instead of the carbyl sulfate there may be used homologous products which can be obtained, for instance, from butyl alcohol or butylene and sulfuric anhydride, for instance with the use of liquid sulfur dioxide as a solvent.

As alcohols there may be used for example cetyl alcohol, stearyl alcohol or oleic alcohol or naphthenyl alcohol, mixtures of paraffines and alcohols and the like, sterines, such as phytosterine or mixtures containing sterine, such as wool wax (a mixture of wool fat and alcohol); instead of these alcohols there may likewise be used oils or fats containing hydroxyl such as castor oil or hydroxystearic acid ester and the like, the reaction being conducted, under conditions whereby saponification is avoided, so that only the alcoholic hydroxyl group of the fat enters into reaction. Aliphatic bodies containing several hydroxyl groups may likewise be used, for instance starch, cellulose, polyvinyl alcohol, poly-glycerin, partial saponification products of polyvinyl acetate and the like. Instead of the aforesaid aliphatic and other hydroxy-sulfonic acids or the derivatives thereof, there may be used halogen ethane-sulfonic acids, for instance chloro-ethane-sulfonic acid and the like. All assistants which are suitable for promoting the alkoxylation, for instance catalysts, metallic sodium may be used.

Wax-like bodies, i. e. esterification products of aliphatic or hydroaromatic acids of high molecular weight and aliphatic or hydroaromatic alcohols of high molecular weight may likewise be treated with ethionic acid or with carbyl sulfate or with homologous and analogous aliphatic derivatives of sulfonic acid, whereby there are obtained with simultaneous fission of the wax-like esters, products of a mixed character which are soluble in water and acids. These mixed products are excellently suitable as wetting agents, washing agents, dispersing agents, emulsifying agents and the like.

It could not have been foreseen that the reaction would take such a course, but it was to be expected that under these conditions the wax-like esters could not be converted into the water-soluble form. The process involves a particular industrial advantage, because it is possible to work up in one operation both the alcoholic acid and the acidic components of the wax without isolating them. It is, therefore, unnecessary for instance first to liberate the alcohols from the waxes, to isolate them and then to work them up.

The present process may advantageously be applied for working up in an easy and economical manner so as to obtain valuable wetting agents, cheap products such as the wax-like esters which are obtainable by the oxidation of paraffin or the wax mixtures known as wool fat. The process may likewise be successfully applied to vegetable waxes, such as Japanese wax, carnauba wax and to fossil waxes, such as Montan wax and the bleached products therefrom. Among the insect waxes beeswax may be particularly mentioned as a suitable starting material. Instead of ethionic acid or carbyl sulfate there may be used analogous products obtainable from alcohols of high molecular weight or from poly alcohols with sulfur trioxide, and the like.

The following examples serve to illustrate our invention, but they are not intended to limit it thereto, the parts being by weight:

(1) 270 parts of stearyl alcohol are introduced in the course of 1 hour at a temperature between 40° C. and 50° C. into 206 parts of ethionic acid, while stirring. Stirring is continued at this temperature until a test sample is soluble in water to a clear solution. The product obtained which is presumed to be the sulfonic acid of ethyl-stearyl ether is converted into its ammonium salt or sodium salt and in this form constitutes an excellent substitute for soap.

(2) 100 parts of cotton are kneaded in a mixing and kneading machine at a temperature between about 30° C. and 40° C. together with 30 parts of ethionic acid. There is obtained a water-soluble product which after neutralization can be used as an assistant in the textile industry, for instance as sizing agent and the like.

(3) Into a solution of 150 parts of naphthenyl alcohol in benzene 23 parts of sodium in the form of slices are introduced. The mixture is stirred at a raised temperature until the sodium has completely dissolved. In the course of 1 hour 210 parts of sodium chloroethane sulfonate (of 80 per cent. strength) are added and the whole is boiled for 4 hours in a reflux apparatus. The benzene is then removed by distillation and 270 parts of water are added while well stirring. The product is obtained in the form of a solution of about 50 per cent. strength which is suitable for use as a wetting agent in concentrated alkali solutions and acids.

(4) 126 parts of hydroxy-ethane-sulfonic acid are caused to run into 175 parts of a mixture of alcohols obtainable by the hydrogenation of coconut oil. The mixture is stirred for 5 hours at a temperature between 170° C. and 180° C. and the reaction product is then soluble in hot water to a clear solution. The solutions of the product have a great foaming power; they have to a marked extent the property of reducing the surface tension and therefore they can advantageously be used as wetting agents in the branches of the textile industry involving operation in the presence of acids, for instance in the carbonization. The reaction product may likewise be used in the textile industry in the form of its salts for instance as a washing agent or as a bucking agent.

The reaction product prepared in a manner analogous to that described in this example from oleic alcohol and hydroxy-ethane-sulfonic acid may likewise be used as a washing agent, for instance for washing wool containing suint.

Instead of hydroxy-ethane-sulfonic acid may likewise be used the hydroxy-butane-sulfonic acid obtainable by treating n-butyl-alcohol with $SO_3$.

(5) 150 parts of ethionic acid are added, while stirring, in the course of 1 hour to 150 parts of spermaceti at a temperature between 50° C. and 60° C. and the mixture is kept for some time at this temperature. The product obtained solidifies in the cold and dissolves in hot water to a solution which foams strongly. The acid mixture thus produced may be used either by itself in the textile industry and the like or it may be converted into a new form by means of alkalies. Particularly remarkable is the high resistance of the product thus obtained towards lime.

(6) Into 60 parts of molten bee's wax 50 parts of carbyl sulfate are caused to run in the course of half an hour at a temperature between 50° C. and 60° C. The mixture is stirred at this temperature for 15–20 hours and neutralized in a kneading machine with 36 parts of sodium carbonate while simultaneously adding 40 parts of water. There are thus obtained 186 parts of a paste which is soluble in hot water to a nearly clear solution and which can be used for scrooping artificial silk and for dressing purposes.

(7) 50 parts of ethionic acid are caused to run into 60 parts of molten Japanese wax at a temperature between 50° C. and 60° C. as it is described in Example 6. The reaction and working up are conducted as described in the foregoing example. The product obtained is particularly suitable for use as a carrier in the preparation of paraffin emulsions.

(8) 74 parts of butyl alcohol and 126 parts of hydroxy-ethane-sulfonic acid are caused to react as described in Example 4. There is obtained a wetting agent which is stable in the strongest alkali solutions and can be used with particular advantage for mercerization.

We claim:

1. The compounds of the following formula:

wherein $R_1$ stands for a hydrocarbon radical, the molecule of which contains more than 3 carbon atoms and Z stands for H or alkyl, and Me stands for hydrogen, an alkali metal or ammonium, having a particularly strong foaming power and an excellent soap-like action and simultaneously an intense resistance to lime.

2. The compound of the following formula:

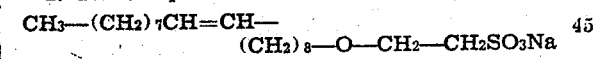

having a particularly strong foaming power and an excellent soap-like action and simultaneously an intense resistance to lime.

3. The compounds of the following formula:

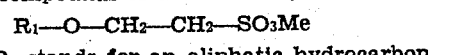

wherein $R_1$ stands for an aliphatic hydrocarbon radical, the molecule of which contains more than 3 carbon atoms and Me stands for hydrogen, an alkali metal or ammonium, having a particularly strong foaming power and an excellent soap-like action and simultaneously an intense resistance to lime.

4. The compound of the following formula:

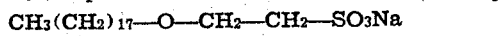

having a particularly strong foaming power and an excellent soap-like action and simultaneously an intense resistance to lime.

5. The compound of the following formula:

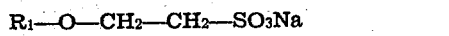

wherein $R_1$ stands for the aliphatic radical of the alcohols obtainable by the hydrogenation of coconut oil, having a particularly strong foaming power and an excellent soap-like action and simultaneously an intense resistance to lime.

ADOLF STEINDORFF.
KARL DAIMLER.
KARL PLATZ.